Patented June 14, 1949

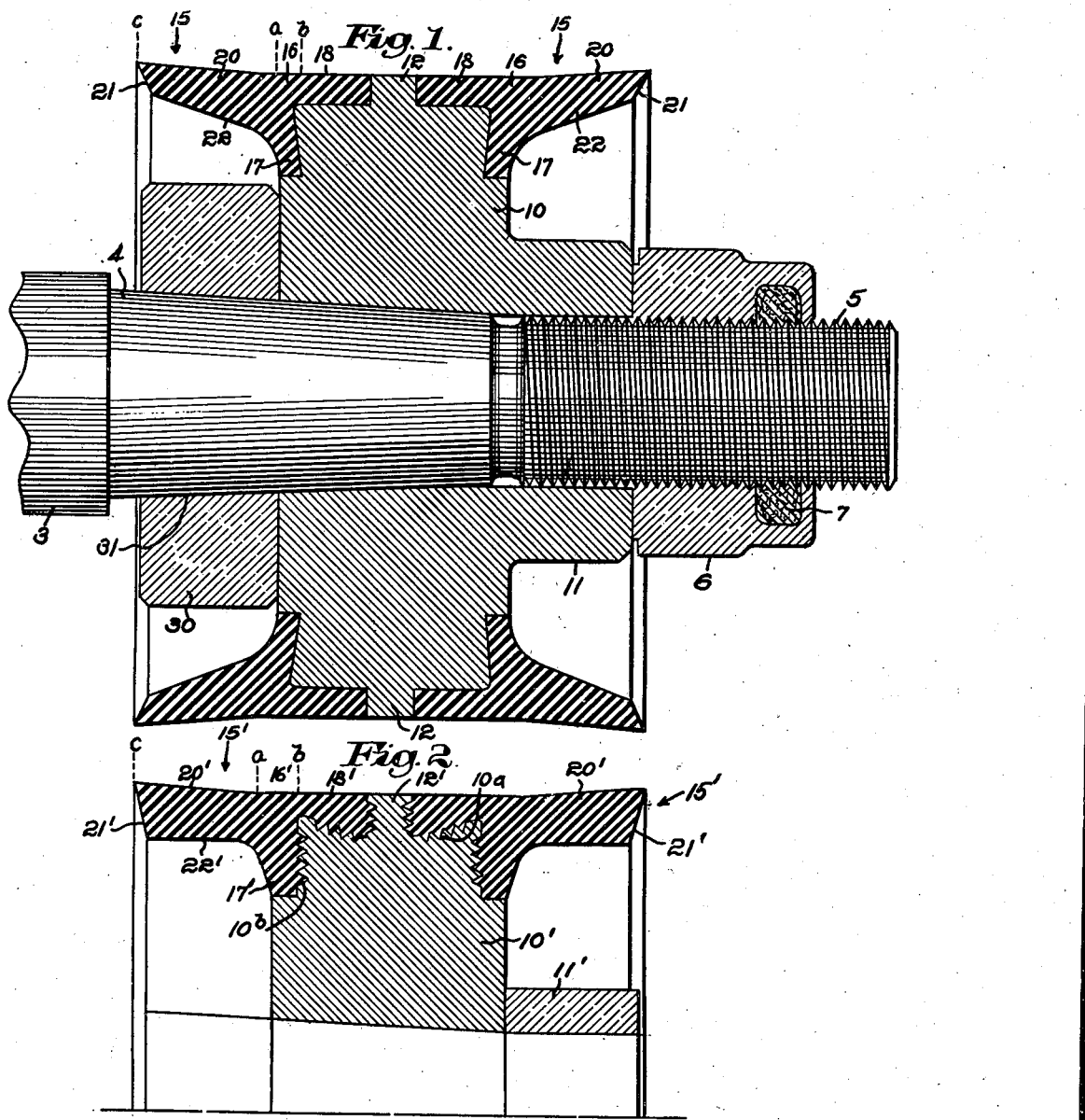

2,473,064

UNITED STATES PATENT OFFICE 2,473,064

RECIPROCATING PUMP PISTON AND ASSEMBLY

Arthur L. Leman, Houston, Tex.

Application September 21, 1945, Serial No. 617,733

10 Claims. (Cl. 309—4)

My present invention relates to reciprocating pumps, especially those for handling liquids and semi-liquids carrying abrasives and other solid matter, such as slush pumps. More particularly the invention aims to provide an improved piston unit and assembly for such pumps, of simple and rugged construction and extended serviceability in its field of use.

In the drawings, illustrating exemplary embodiments of the invention:

Fig. 1 is a central longitudinal cross-section through the piston and rod assembly; and Fig. 2 is a corresponding partial view of a modified construction.

Referring to the drawings in more detail, the illustrated end portion of the reciprocating piston rod 3 includes a conically tapering section 4 and a terminal part 5 of uniform diameter and threaded for reception of a retaining nut 6, preferably of the lock type or having locking means as indicated at 7.

The piston proper is moulded and comprises a metallic core equipped with resilient packing means. It will be understood that the piston reciprocates axially or longitudinally in a cylinder in sliding relation to the cylinder wall, which latter may have a replaceable liner.

In the illustrative embodiment of Fig. 1, the piston core comprises a cylindrical or disc-like body 10 of suitable metal shown as integrally formed and including at one end face a reduced hub 11. Medially disposed on the body of the piston core is a transverse peripheral rib 12 projecting radially and having its circumferential face preferably exposed to define the central outer surface for the piston.

The piston further comprises an opposed and generally symmetrical pair of resilient packing members or sleeves, each indicated generally at 15, of rubber or a rubber-like composition. Each such member has between its ends an annular body section 16 a portion of which provides an inwardly extending generally radial flange 17. This flanged body section is of limited extent in the axial direction and corresponding the flange is relatively thin. The diametral planes approximately at the longitudinally outer and inner boundaries of a body section 16 are generally indicated by the dotted lines $a$ and $b$ at the upper left in Fig. 1. The flange 17 radially overlaps the adjacent end of the core, which may be reduced for radial engagement with it.

At the inner end of each packing sleeve 15 is an annular section 18, integral with the thin body section 16 and adapted to extend between the latter and the peripheral rib 12 of the core. This annular section or body extension 18, also the sleeve body 16 and the core rib 12 have approximately the same outer diameter, to fit the particular piston cylinder wall. The inner diameter of the annular section 18 substantially conforms to or averages the outer diameter of body flange 17, so that said portion 18 comprises a relatively thin wall, radially. It is here noted that the extent of the flange 17 longitudinally, in the direction paralleling the core axis, is distinctly less than its radial extent, giving the flange and the body section as a whole increased capacity for expansion and contraction radially rather than axially.

At the outer end of each packing sleeve 15 there is integrally formed an annular lip 20 of substantial free longitudinal extent, terminating at a diametral plane indicated by the dotted line marked $c$ in Fig. 1. The length of the sleeve 20 as shown is materially greater than that of the body section 16 and of the flange 17 of the latter, and desirably is at least as great as the length of the annulus 18. Since at both ends the piston core 10 either terminates at or about the beginning plane $a$ of the lip or is of reduced diameter at any portion radially opposite the corresponding lip, the two lips 20 are free to expand and contract radially; and by reason of the longitudinal extent of the lips, said action is afforded for a large portion of the total piston length, up to or exceeding about one-half thereof, including the two packing sleeves.

Each lip 20 forms a continuation, at its inner end, of the corresponding sleeve body section 16 and annulus 18. Preferably it gradually increases in outer diameter toward its outer end, in the natural or non-compacted condition of the resilient material, substantially as illustrated. The outer end wall of the lip desirably is somewhat inclined inwardly as at 21, while the inner longitudinal face 22 merges inwardly into the adjacent end of the body section 16 and flange 17. In the form of Fig. 1 the lip gradually decreases in inner diameter toward the center of the piston and flows into the end face of the body section flange along a relatively flat curve. In the modification of Fig. 2 the inner longitudinal wall of the lip 20' is cylindrical or approximately so for a major outer portion of its length, substantially to its curvilinear junction with the relatively thin flange 17'.

It will be understood that the resilient packing sleeves 15 are molded directly on or are bonded to the metallic core 10, which latter desirably is an integral element, solid or otherwise, except for the axis opening for the piston rod, the core preferably being of cast iron. The invention provides for such molded piston, as compared with the earlier assembled types, an importantly extended service life, due largely to the absence of joint apertures between the resilient packing elements and the metallic or rigid part of the piston. In the known assembled pistons, joint apertures alternately open and close as the pistons reciprocate. Such apertures, when open, collect solid matter. On closing, they discharge this solid matter against the liner walls, forming sharp grooves. The resultant grooves then tear the resilient packing until failure occurs. Such objectionable action is substantially eliminated in the molded piston of my present invention, including the disclosed structure, shape and proportioning for the packing elements, their relation to the metallic core, and particularly the described relatively thin flanged body section.

In previous constructions, such for example as Leman Patent 1,927,460, granted September 19, 1933 the packing bodies, being comparatively massive and thick, particularly lengthwise, tended to become tightly wedged outward against the cylinder liner. Hence at the start of suction strokes, when the radially projective portion of the piston core is pulling on the packing, the bond of the latter gives way and the packing separates, generally first adjacent said core portion. When this separation occurs, the aperture collects and discharges abrasives in the same manner as assembled pistons. The life of the piston and liner is largely determined by the length of time a piston will run without separation. In my improved construction, including the longitudinally thin packing body, objectionable wedging is reduced and the resilient material of the packing frees itself from the cylinder wall more readily, and the bond, especially at the peripheral rib of my piston core as well as throughout the bonded area, remains intact over long periods of heavy duty.

The self freeing action, when the piston stroke reverses, arises from the novel construction of the long packing lip such as 20, 20' having the inner surface open to the fluid from the outer end of the packing to a transverse plane adjacent the base or inner end of the lip, and the interrelation of the lip to the portion of the packing inwardly beyond that plane. In this connection it will be noted that as illustrated the piston core has at either side of the medial rib or flange 12 a smaller circular surface about which the annular section 18 is located. Such surface of smaller radius extends in the axial direction to the inwardly receding surface at the inner face of the portion 17 of the packing, which inwardly receding surface is substantially transverse. The relative location of these surfaces and the mentioned transverse plane determine the axial and radial extents of the inner packing portions such as 17 and 18 and their relation to the long fluid-subject lip 20 and afford to the packing material adjacent the inwardly receding transverse surface a capacity for radial distortion under pressure and rapid recovery on piston reversal.

In Fig. 2, corresponding approximately to the upper half of Fig. 1, similar parts have the same reference numerals with the addition of prime marks. In this instance the body 10' of the metallic piston core is symmetrical at both sides of the peripheral lip 12', a separate collar or washer 11' being interposed between the outer end face of the core and the locking nut. The radially thin annular sections 18' are here shown as of decreasing internal diameter toward the core rib, the metallic core being correspondingly inclined inwardly as at 10a. The average radial dimension of each annular section 18' may be similarly limited as in Fig. 1, for a given size of piston. The inner transverse faces of the thin body flanges 17' follow a general plane perpendicular to the core axis. The corresponding surfaces of the core for bonding to the flanges, also those receiving the annular sections 18', including if desired the radial faces of the core lip 12', may be serrated, fluted or of other non-planar formation as indicated at 10b, such formation being also employed if desired in connection with the Fig. 1 embodiment. As previously mentioned, the elongated freely projecting lips 20' are illustrated in Fig. 2 as having their inner peripheral faces along a substantially cylindrical surface for major outer portions of their total length. Other modifications of the packing sleeves and correspondingly of the metallic core are contemplated by the invention in keeping with the relatively thin or longitudinally limited structure for the intermediate annular body and radially extensive inward flange thereof.

The invention further comprises novel means in combination with the molded piston and the piston rod 3 for facilitating installation and removal of the piston proper, including the metallic core and the bonded resilient packing members, with respect to the rod. As illustrated in Fig. 1, said means comprises a metallic stop collar 30, of a size to abut the inner face of the piston, and having a central conically tapered aperture or bore as indicated at 31. The collar member 30 is of substantial thickness, in the axial direction, herein approximately corresponding to the length of the core hub portion 11 and to the freely projective extent of the packing ribs 20. The diameter of the collar bore 31 as compared with that of the conical portion of the rod at which the collar is positioned is made relatively less than the bore diameter of the piston with respect to its enclosed rod portion. That is, the bore diametral differential is less for the collar than for the piston. Also, the collar preferably is of a material such as steel having a greater elasticity than that of the piston core, generally cast iron, such different metallic composition being indicated by the different hatching of these parts.

Further, the diameter and taper for the wall of the collar aperture 31 are so calculated with reference to the conical section 4 of the piston rod that the collar 30 has a tight wedging fit on the rod at such position that the outer end face of the collar then presents a positive limiting stop for the piston, at the correct installed location of the latter, that is when the piston joint is tight enough on the conical rod section 4 to effect a fluid seal. Hence when the collar 30 and piston core 10 are forced on the rod by the nut 6, the stop collar 30 due to its smaller relative bore, is expanded more than the core and exerts a greater unit bearing pressure on the rod than does the core. The relative difference between bearing pressures of the collar and of the core is further increased by the difference in the moduli of elasticity where the collar is of steel and the core is of cast iron as illustrated. Thus end thrust is transmitted between the rod and the piston largely through the stop collar 30. Hence the piston is easily removable from the rod, even after long periods of service, whereas heretofore taper-bored pistons have frequently become so tightly wedged onto the rods that removal has been difficult without mutilation of the parts.

My invention is not limited to the embodiments thereof as illustrated or described, its scope being pointed out in the following claims.

I claim:

1. A double-acting reciprocating-pump piston comprising a metallic core with a medial flange and a smaller circular surface on either side of the flange extending axially to an inwardly receding substantially transverse surface that is closer to the mid-section than to the end of the piston, and a rubberous packing molded on the core with its outside surface substantially flush with the periphery of the medial flange, and having an inner surface open to the fluid from the outer end of the packing to a transverse plane at not greater axial distance from the inner than from the outer end of the packing, said transverse plane also being at a less distance from the inwardly receding substantially transverse surface than the latter is from the piston mid-section.

2. A double-acting reciprocating-pump piston comprising a metallic core with a medial flange and a smaller circular surface on either side of the flange extending axially to an inwardly receding substantially transverse surface that is closer to the mid-section than to the end of the piston, and a rubberous packing molded on the core with its outside surface substantially flush with the periphery of the medial flange, and having an inner surface open to the fluid from the outer end of the packing to a transverse plane at not greater axial distance from the inwardly receding substantially transverse surface than from the outer end of the packing, said transverse plane also being at a less distance from the inwardly receding substantially transverse surface than the latter is from the piston mid-section.

3. A double-acting reciprocating-pump piston comprising a metallic core with a medial flange and a smaller circular surface on either side of the flange extending axially to an inwardly receding substantially transverse surface that is closer to the mid-section than to the end of the piston, and a rubberous packing molded on the core with its outside surface substantially flush with the periphery of the medial flange, and having an inner surface open to the fluid from the outer end of the packing to a transverse plane at not greater axial distance from the inwardly receding substantially transverse surface than the radial thickness of the packing in the transverse plane.

4. A double-acting reciprocating-pump piston comprising a metallic core with a medial flange and a smaller circular surface on either side of the flange extending axially to an inwardly receding substantially transverse surface that is closer to the mid-section than to the end of the piston, and a rubberous packing molded on the core with its outside surface substantially flush with the periphery of the medial flange, and having an inner surface open to the fluid from the outer end of the packing to a transverse plane at not greater axial distance from the inwardly receding substantially transverse surface than the inwardly receding substantially transverse surface is from the piston mid-section.

5. A double-acting reciprocating-pump piston comprising a metallic core with a flange positioned medially in respect to the ends of the piston, and a circular surface on either side and of smaller periphery than the flange and extending axially to an inwardly receding substantially transverse surface, and a rubberous packing element molded on the core with its outside surface substantially flush with the periphery of the medial flange and having a radially free lip on its outer end of greater average radial thickness than the radial thickness of the packing surrounding the circular surface, said lip having a length greater than the distance from the fixed end thereof to said inwardly receding substantially transverse surface.

6. A double-acting reciprocating-pump piston comprising a metallic core with a radial flange, the core having a circular surface on either side of and of smaller periphery than the flange and extending to an inwardly receding substantially transverse surface, a rubberous packing element surrounding and molded onto the core with the rubberous material longitudinally abutting said radial flange, radially abutting said circular surface and longitudinally abutting said transverse surface, and said packing element having the outer end open centrally for an axially inward extent such that the fluid pressure thereat will cause radially outward distortion of the rubberous material contiguous to said transverse surface.

7. A double-acting reciprocating-pump piston comprising a metallic core with a radial flange on either side of which is molded a rubberous packing with its outer surface substantially flush with the periphery of the flange, said packing having a generally longitudinal inner surface that is exposed to the fluid from the outer end of the packing inwardly for more than half the axial length of the packing, the piston core having at the outer end an associated central element providing an end face for thrust-supporting engagement with a retaining nut, and said exposed inner surface of the packing extending axially inward to a transverse plane spaced from said end face.

8. A double-acting reciprocating-pump piston according to claim 7 wherein the core-associated central element is a hub extension.

9. A double-acting reciprocating-pump piston according to claim 7 wherein the core-associated central element is a separable collar.

10. A double-acting reciprocating pump piston comprising a metallic core with a radial flange on either side of which is molded a rubberous packing with its outer surface substantially flush with the periphery of the flange, said packing having a generally longitudinal inner surface that is exposed to the fluid from the outer end of the packing inwardly for more than half the axial length of the packing, the packing inwardly beyond a transverse plane adjacent the inner end of said inner surface having a volume so proportioned to that of the packing outwardly beyond said transverse plane as to permit during the piston pressure stroke radial distortion of the rubberous packing within the volume which is inwardly beyond said transverse plane and providing for quick radial withdrawal of said packing distortion upon reversal of the piston stroke.

ARTHUR L. LEMAN.

REFERENCES CITED

The following references are of record in the file of this patent:

UNITED STATES PATENTS

| Number | Name | Date |
| --- | --- | --- |
| 1,927,460 | Leman | Sept 19, 1933 |
| 2,111,312 | Clark | Mar. 15, 1938 |
| 2,162,162 | Wells | June 20, 1939 |
| 2,216,577 | Stillwagon | Oct. 1, 1940 |
| 2,274,927 | Lankford | Mar. 3, 1942 |
| 2,287,483 | Miller | June 23, 1942 |